United States Patent [19]

Aratame

[11] 4,383,746
[45] May 17, 1983

[54] MULTIEXPOSABLE MOTOR-DRIVE-FILM-WINDING CAMERA

[75] Inventor: Kazuhisa Aratame, Hachioji, Japan

[73] Assignee: Konishiroku Photo Industry Co., Ltd., Tokyo, Japan

[21] Appl. No.: 261,947

[22] Filed: May 8, 1981

[30] Foreign Application Priority Data

May 15, 1980 [JP] Japan ................... 55-63428

[51] Int. Cl.³ ............................................. G03B 1/18
[52] U.S. Cl. ................................... 354/173; 354/209
[58] Field of Search ............... 354/170, 171, 173, 204, 354/205, 206, 209

[56] References Cited

U.S. PATENT DOCUMENTS

| | | | |
|---|---|---|---|
| 4,017,875 | 4/1977 | Yamamichi | 354/209 |
| 4,021,826 | 5/1977 | Iwata et al. | 354/209 |
| 4,075,646 | 2/1978 | Kurasawa | 354/209 |
| 4,171,156 | 10/1979 | Tsunefuji | 354/209 |
| 4,194,824 | 3/1980 | Arai et al. | 354/209 |

*Primary Examiner*—Russell E. Adams
*Attorney, Agent, or Firm*—Linda Bierman; Jordan B. Bierman

[57] ABSTRACT

In a motor-drive film-winding camera of the type capable of multiexposure, having separate motors for cocking the shutter (or the mirror in a single lens reflex camera), and for film winding, a changeover is provided to switch from normal operation with energization of both motors to a multiexposure mode providing for double exposure operating the shutter cocking motor while the film-winding motor remains idle. Operation is limited to a double exposure since when the latter is completed, the changeover switch is overridden and the system returns to normal operation.

2 Claims, 4 Drawing Figures

MULTIEXPOSABLE MOTOR-DRIVE-FILM-WINDING CAMERA

BACKGROUND OF THE INVENTION

1. Field of the Invention

The present invention relates to the improvement in a camera provided with a motor for cocking the shutter and the like and with a motor for winding film, both motors being driven according to an external, and more particularly to a multiexposable motor-drive-film-winding camera.

2. Description of the Prior Art

In conventional motor-drive-film-winding cameras, even in the case where they are provided with a motor for cocking the shutter, or the mirror in single lens reflex cameras separately, from that for winding film, both motors are driven together each time an exposure is made. For making multiexposures, therefore, prevention of the rotation of the sprocket for film winding or of the reel has heretofore been made in such a way as by disengagement or slipping of the motion transmission mechanism. Accordingly, the realization of multiexposure in this manner brought about the disadvantage that it required a complex motion transmission mechanism and excessive power comsumption at the time of exposures.

SUMMARY OF THE INVENTION

The present invention aims at solving the above-described disadvantage of a multiexposable motor-drive-film winding camera. An object of the present invention is to provide a camera provided with a motor for cocking the shutter and the like and with a motor for film winding, both the motors being driven according to a shutter release completion signal, said camera being a multiexposable motor-drive-film-winding camera having changeover means which makes the film-winding motor non-driving to produce a multiexposure-charged condition, and which subsequently changes said cocked condition to the normal exposure condition by driving the film-winding motor only.

In other words, the multiexposable motor-drive-film-winding camera of the present invention effects the production of a multiexposable condition by preventing the film-winding motor from driving while at the same time driving the cocking motor, and also enables returning from the cocked multiexposable condition to the normal exposure condition by driving the film-winding motor only.

DETAILED DESCRIPTION OF THE PREFERRED EMBODIMENTS

Figure 1:
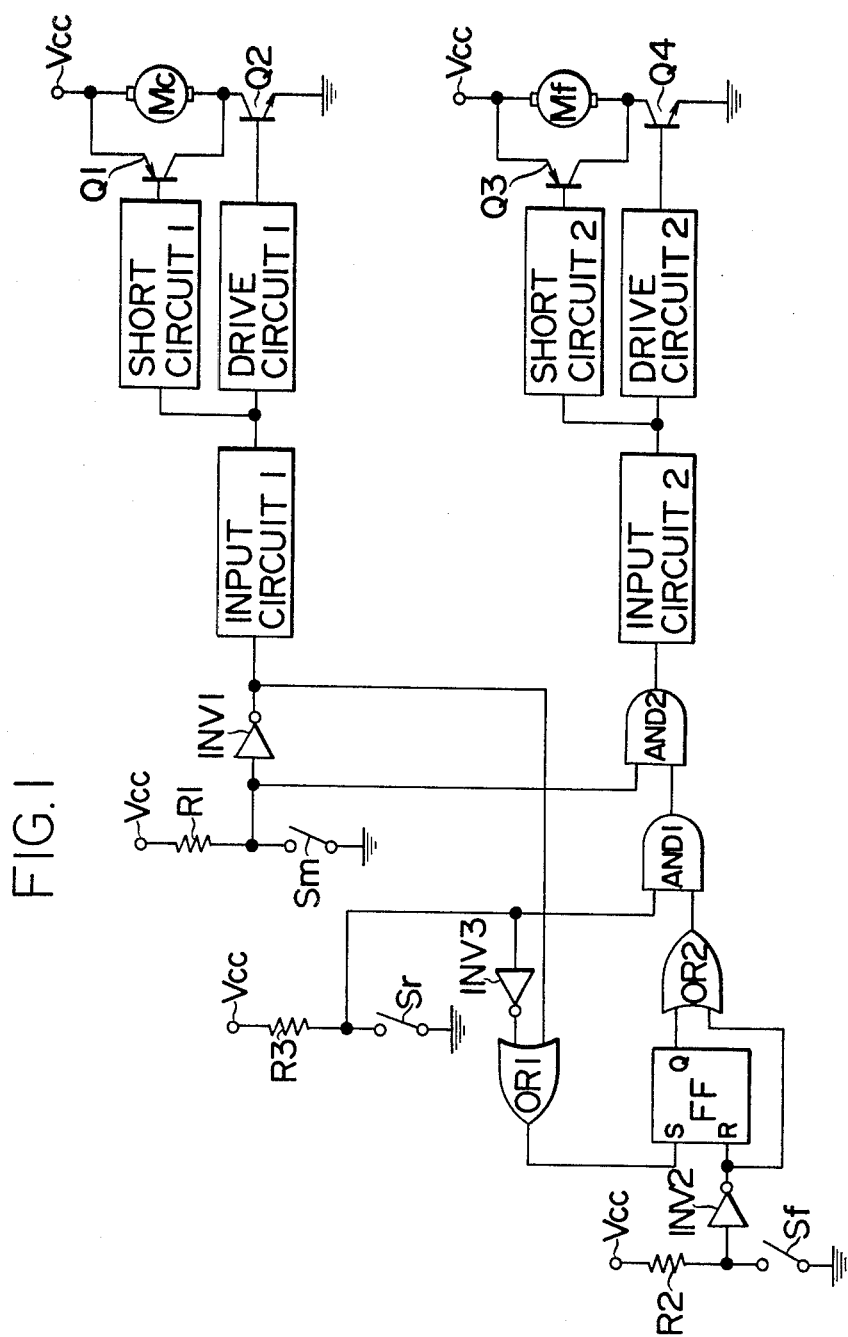
FIG. 1 is a circuit diagram of a motor-winding camera according to one example of the present invention.

In FIG. 1, Mc is the cocking motor for the shutter or for the mirror of a single lens reflex camera; Mf is the film-winding motor; Sm is an ON-OFF switch which is turned ON upon completion of an exposure, i.e., upon completion of the run of the rear diaphragm of a focal plane shutter or of the closing of a lens shutter and which is turned OFF upon completion of the shutter cocking or of the mirror cocking in a single lens reflex camera; Sf is an ON-OFF switch which is turned ON upon the initiation of the film-winding and OFF upon a one-frame advance of film; Sr is a changeover switch which makes film-winding motor Mf non-driving to produce a cocked condition for the multiexposure and which also energizes film-winding motor Mf to change the cocked condition to the normal exposure condition; INV1 to INV3 are invertor circuits; AND1 and AND2 are AND gates; OR1 and OR2 are OR gates; FF is a flip flop circuit; Q1 to Q4 are transistors; R1 to R3 are resistors; and Vcc are supply voltage terminals.

When normal exposures are desired, changeover switch Sr is kept in the OFF position. In this condition, the inputs to invertor circuit INV3 and to one input terminal of AND circuit AND1 are high level "1,". Therefore OR circuit OR1 one input terminal of which is fed low level output "zero" from invertor circuit INV3, is in the condition that it passes through the output from invertor circuit INV1 connected to its other input terminal, while AND circuit AND1 is in the condition that it receives the output from OR circuit OR2 that is connected to its other input terminal. When the shutter is cocked and film winding is completed, switches Sm and Sf are turned OFF. At this point the inputs to invertor circuits INV1 and INV2 are high level "1", while their outputs are low level "zero", and input circuit 1 that receives directly the output from invertor circuit INV1 does not operate drive circuit 1, so that charging motor Mc is not driven. The output "zero" from invertor circuit INV1 is fed through OR circuit OR1 to setting terminal S of flip flop circuit FF, while the output "zero" from invertor circuit INV2 is fed to reset terminal R, so that the output from Q is "zero". The output from OR circuit OR2 to which are fed the output "zero" from Q and the output "zero" from invertor INV2 is "zero", thus the output from AND circuit AND1 is also "zero", consequently the output from AND circuit AND2 from which it is fed is "zero" as well, and input circuit 2 that receives the output does not operate drive circuit 2, whereby film-winding motor Mf is not driven either. Thus, when a release operation is effected, a series of sequential exposure actions start to perform shutter release operations, and upon completion of the exposures, switch Sm is turned ON. As switch Sm is turned ON, the input to invertor circuit INV1 changes to low level "zero", the output from which becomes high level "1" to be fed through input circuit 1 and OR circuit OR1 to setting terminal S of flip flop circuit FF. Input circuit 1 to which has been fed the high level output "1" from invertor circuit INV1 causes drive circuit 1 to make transistor Q2 conductive, and causes short circuit 1 to make transistor Q1 nontransmissive, so that charging motor Mc alone is first rotated. On the other hand, flip flop circuit FF to whose setting terminal S is fed the output "1" from invertor circuit INV1, is placed in the setting condition, and the output from Q becomes "1", whereby the output from OR circuit OR2 as well as that from AND circuit AND1 also becomes "1". However at this time, the input to the other input terminal of AND circuit AND2 is already "zero" according to the ON condition of switch Sm, hence the output from AND 2 still remains ON, and at this stage film-winding motor does not yet rotate. When charging motor Mc rotates and thus the cocking of the shutter and the like is completed, switch Sm which has been ON is turned OFF, and then the inputs invertor circuit INV1 and to AND circuit AND2 become "1". Accordingly, the output from invertor circuit INV1 becomes "zero", whereby input circuit 1 causes drive circuit 1 to make transistor Q noncondutive and also causes short circuit 1 to make transistor Q1 conductive, thereby quickly stopping cocking motor Mc. In addition, the output from AND circuit AND 2 the input to the other input terminal of which had become "1" becomes "1", whereby input circuit 2 causes drive circuit 2 to make transistor Q4 conductive and also causes short circuit 2 to make transistor Q3 nonconductive, thus causing film-winding motor Mf to wind film. As film-winding motor Mf rotates, switch Sf is turned ON, the input to invertor circuit INV2 becomes "zero" and the output from it becomes "1", whereby flip flop circuit FF is reset, so that the output from Q becomes "zero". At this time, however, the output "1" from invertor circuit INV2 is fed to one input terminal of OR circuit OR2, so that the output from OR2 still keeps being "1", and therefore the outputs from AND circuits AND1 and AND2 also keep being "1" to continue the rotation of film-winding motor Mf. Upon completion of the film winding for one frame, switch Sf is turned OFF, the input to invertor INV2 becomes "1", and the output therefrom becomes "zero", whereby the input to OR circuit OR2 also becomes "zero", so that the output from OR2 becomes "zero" as well. Therefore, the outputs from AND circuits AND1 and AND2 also become "zero", whereby input 2 causes drive circuit 2 to make transistor Q4 nonconductive and also causes short circuit 2 to make transistor Q3 conductive, thus stopping quickly film-winding motor Mf. the condition that film-winding motor Mf is stopped provides an initial condition that the shutter is charged and film winding is completed, so that when a release operation is again effected, normal exposures are successively carried out.

When it is desired to make multiple exposures, changeover switch Sr of the changeover means should be turned ON, whereby the input to one input terminal of AND circuit AND1 becomes the low level "zero", so that the output from AND1 is maintained "zero" and that from AND circuit AND2 also is maintained "zero". Then, when a release operation is made in the condition that the shutter is charged and film winding is completed, exposures are operated in a similar manner to normal exposures, and upon completion of the exposures, charging motor Mc rotates to charge the shutter and the like, but because, as has been mentioned, the output from AND circuit AND2 remains "zero", film winding motor Mf is not rotated, thus film is not wound. Therefore if the release operation is resumed, a double exposure is carried out, and by repeating further successive release operations, triple or multiple exposures can be accomplished. Returning the above-described multiple exposure-charged condition to the normal exposure condition can be effected by turning ON changeover switch Sr which has been OFF; more specifically, changeover switch Sr is beforehand turned ON, whereby the input to invertor circuit INV3 is low level "zero", and the resulting high level output "1" from INV3 is fed through OR circuit OR1 to terminal S of flip flop circuit FF; thus the output from Q of flip flop circuit FF is high level "1", which is fed through OR circuit OR2 to one input terminal of AND circuit AND1, so that by turning changeover switch Sr OFF, high level "1" is also fed to the other input terminal of AND circuit AND1, and AND circuit AND1 produces high level "1". AND circuit AND2 into one input terminal of which is fed the output of AND 1, and because high level "1" caused by switch Sm being OFF is also fed to the other input terminal, outputs high level "1" to rotate film-winding motor Mf to operate the winding of film. As film-winding motor Mf rotates, as in the case of normal exposure operation, switch Sf is turned ON to reset the flip flop circuit to effect the winding of film for one film frame. Upon completion of the one frame winding, switch Sf is turned OFF, thereby stopping film winding motor Mf. Thus the shutter and the like are completely cocked to complete the film winding; such condition permits subsequent release operation to carry out a normal exposure.

Figure 2:
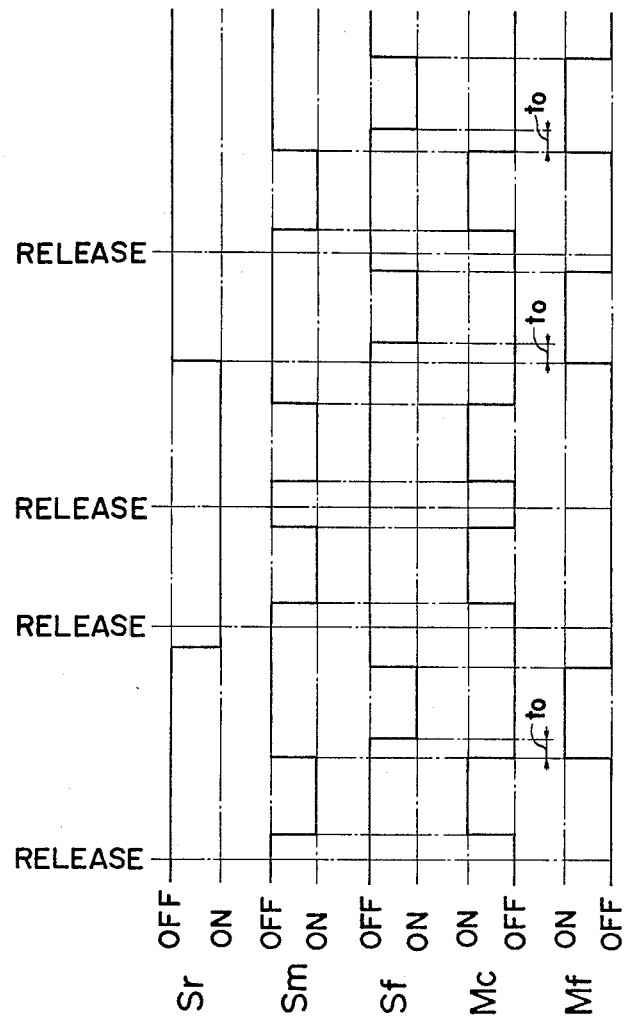
FIG. 2 is a time chart illustrating the sequence of operations of the circuit in FIG. 1.

FIG. 2 shows the timing of actions of switch Sr, switches Sm and Sf, cocking motor Mc, and film-winding motor Mf. In the figure, to represents the delay of time from the initiation of film-winding motor Mf's rotation until switch Sf is turned ON.

Figure 3:
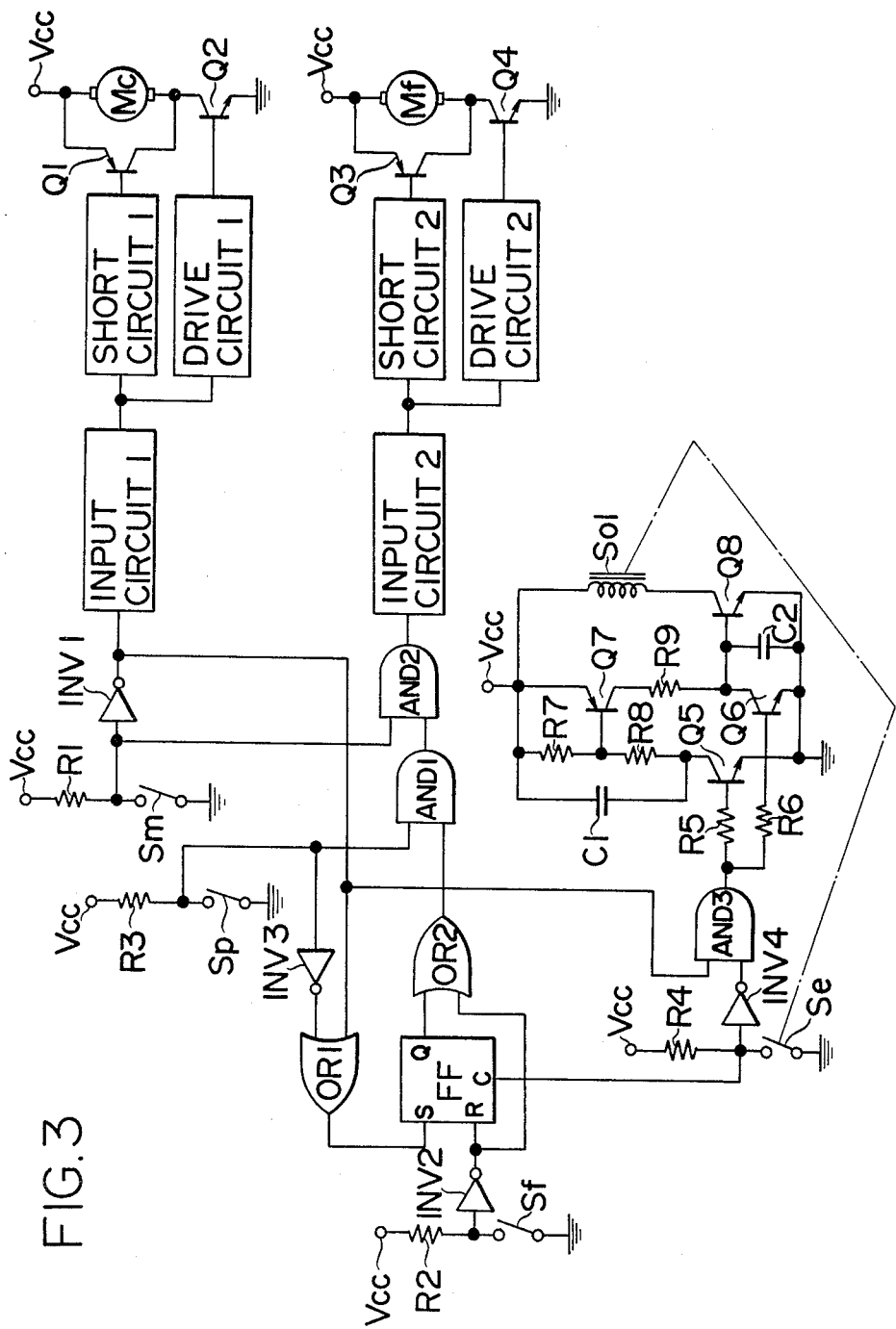
FIG. 3 is a circuit diagram of a modified form of motor-winding camera.

FIG. 3 shows an example of a motor-drive winding camera capable of preventing triple exposures caused by the failure of changing over the changeover means, and further of permitting the change of the double exposure changing condition to the normal exposure condition.

In FIG. 3, Sp is a normally open film-winding switch that effects the drive of film-winding motor Mf only of changeover means; Se is a double exposure switch that makes nondriving the film-winding motor only of changeover means; Sol is a solenoid for turning OFF the double exposure switch Se which is ON; INV4 is an invertor circuit; R3 to R8 are resistors; Q5 to Q8 are transistors; C1 and C2 are condensers; and other symbols or the same as those in FIG. 1 and represent the same functions.

While normal exposures are to be effected, double exposure switch Se is in the OFF condition. Film-winding switch Sp also is in the OFF condition. The condition provides the same condition as in FIG. 1 where changeover switch Sr is OFF. Double exposure switch Se is OFF, so that the condition "1" of terminal C of flip flop circuit FF to which is applied the voltage from supply voltage terminal Vcc provides the same condition as that of the flip flop circuit FF in FIG. 1. On the other hand, in such a condition the input to invertor circuit INV4 is also "1"; therefore the output from INV4 is "zero", so that the output from AND circuit AND3 is "zero" regardless of the output from invertor circuit INV1. Accordingly, transistors Q5 and Q6 are nonconductive; the transistor Q5 being nonconductive, transistor Q7 is also nonconductive, and the transistor Q7 being nonconductive, transistor Q8 is also nonconductive, . . . thus rendering solenoid Sol inoperative. In other words, under the condition that double exposure switch Se is OFF, not operating film-winding switch Sp permits the continuation of normal exposures in quite the same manner as in the circuits of FIG. 1.

For making double exposures, double exposure switch Se is turned ON. Film-winding switch Sp is still not needed to be operated and remains OFF. When double exposure switch Se is turned ON, terminal C of flip flop circuit FF becomes "zero", and flip flop circuit FF becomes inactive, i.e., the output from Q becomes always "zero" regardless of whether or not there are inputs to setting terminal S and reset terminal R. In this condition, the one input to OR circuit OR2 is "zero"

from Q of flip flop circuit FF which is the inactive condition, and the other input from invertor INV2 is "zero" unless film-winding motor Mf rotates, so that unless the film-winding motor Mf rotates, the output from OR circuit OR2 is "zero"; therefore the output from AND circuit AND1 is also "zero", with which the output from AND circuit AND2 is "zero" as well, thus not causing film-winding motor Mf to rotate. In other words, in the condition that double-exposure switch Se is ON, the repetition of release operations makes multiple exposures in the same way as in the case where the changeover switch SR in the circuits of FIG. 1. However, when double exposure switch Se is turned ON, the input to invertor circuit INV4 also becomes "zero", so that the output therefrom becomes "1". As a result, unlike the aforementioned normal exposures, the output from AND circuit AND3 becomes involved in the output from invertor circuit INV1, thereby preventing triple or multiple exposures. This action is further illustrated below:

An exposure is made upon a release operation. At the time of completion of the exposure, switch Sm is turned ON, then the output from invertor circuit INV1 is changed to "1", thus effecting the rotation of charging motor Mc to cock the shutter and the like, and concurrently with that, the output from AND circuit AND3 also becomes "1", which makes transistors Q5 and Q6 conductive; transistor Q5 becoming conductive charges condenser C1 and at the same time makes transistor Q7 conductive. However, even when transistor Q7 becomes conductive, transistor Q6 is conductive, so that base current cannot flow to the base of transistor Q8; thus transistor Q8 is remains nonconductive and solenoid Sol does not act, whereby the ON condition of double exposure switch Se is retained. When the cocking of the shutter and the like is completed and switch Sm is thus turned OFF, the output from invertor circuit INV1 is changed to "zero", with which the output from AND circuit AND3 also becomes "zero" whereby transistors Q5 and Q6 become nonconductive. Even when transistor Q5 becomes nonconductive, transistor Q7 does not immediately become nonconductive but remains conductive while the charge of condenser C1 is being discharged; i.e., only during the time constant $t_1$ determined by resistors R6 and R7. Therefore, when transistor Q6 becomes nonconductive, the base current flows to transistor Q8, thereby causing transistor Q8 to be conductive, so that solenoid Sol acts to turn double-exposure switch Se ON. At this time, the energization of transistor Q8 is delayed by the nonconduction of Q6 during only the time constant $t_2$ determined by resistor R8 and condenser C2, whereby double exposure switch Se is turned OFF only after switch Sm is turned OFF, thus preventing the occurrence of the same conditions in the case where double exposure switch Se has not been turned ON because of the superposing of the OFF of switch Sm and the OFF of double exposure switch Se. In other words, even when double exposure switch Se is turned OFF and thus flip flop circuit FF becomes active, switch Sm is already OFF and the output "zero" from invertor circuit INV1 is fed through OR circuit OR1 to setting terminal S of flip flop circuit FF, so that the output from Q of flip flop circuit FF still remains "zero", and the output from OR circuit OR2 also remains "zero", therefore film-winding motor Mf is not rotated. If a release operation is then carried out, a double exposure is made, and upon completion of the exposure, since at this time double exposure switch Se is already OFF, thus enabling both charging of the shutter and the like and film winding to be simultaneously carried out.

The change of the above-described double exposure-charged condition to the normal exposure condition can be accomplished by depressing film-winding switch Sp to be ON and then by letting go of the switch to be OFF; that is, when film-winding switch Sp is turned ON, the output from invertor circuit INV3 is changed to "1", the output being inputted to setting terminal S of flip flop circuit FF, so that the output from Q of flip flop circuit FF becomes "1", the setting condition, and therefore by subsequently turning film-winding switch Sp OFF, both inputs to AND circuit AND1 become together "1", thus causing the output therefrom to be "1". As a result, the output from AND circuit AND2 also becomes "1", thereby effecting the rotation of film-winding motor Mf. And when film-winding motor Mf rotates, switch Sf is turned ON in the same way as in the normal exposure in FIG. 1 to reset the flip flop circuit and concurrently to continue the rotation of film-winding motor Mf, and upon completion of the winding for one film frame, switch Sf is turned OFF to stop the rotation of film-winding motor Mf. The resulting condition is such a normal exposure operable condition that the shutter and the like are charged and film winding is completed.

Figure 4:
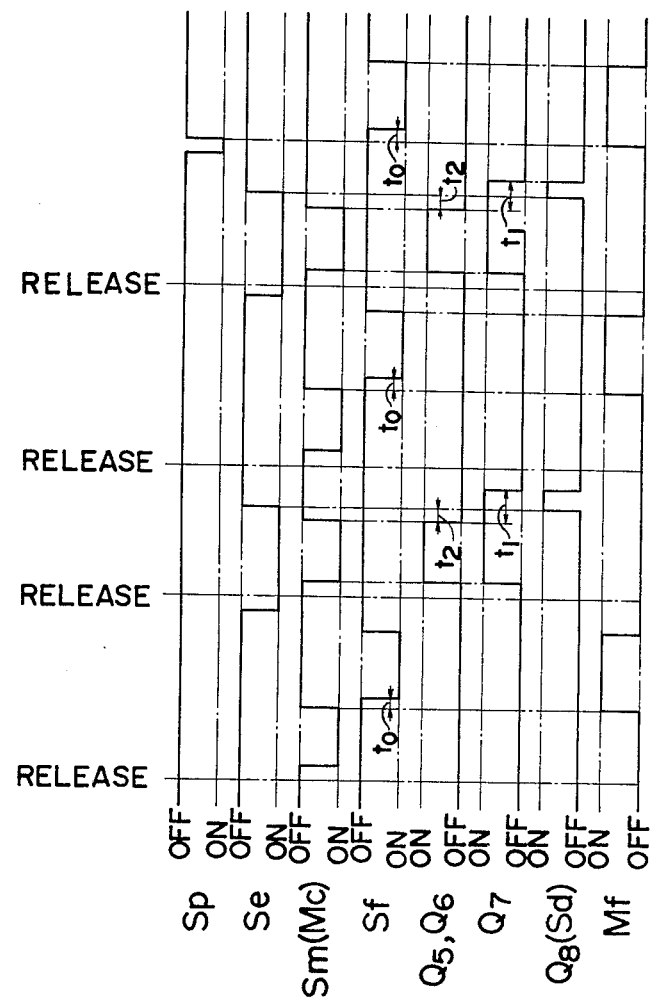
FIG. 4 is a time chart similar to FIG. 2, illustrating the sequence of operations of the circuit of FIG. 3.

FIG. 4 shows the timing action in the circuits of the above-described FIG. 3.

According to the present invention, as has been mentioned above, multiple exposures can be carried out with no complex motion transmission mechanism nor slipping mechanism, and besides, there is such an excellent advantage that the charge from the multiple exposure-charged condition to the normal exposure condition can be readily made by simply winding film without using such a manner as covering the lens with the lens cap before release operations, which have the possibility of light leakage.

What is claimed is:

1. In a multiple exposure camera having a shutter cocking motor and a film-winding motor, a source of power for said motors, means responsive to a shutter release completion signal for normally energizing said motors from said source of power to effect cocking of the camera and subsequently effect a one-frame advance of film, changeover means energizing said shutter cocking motor while maintaining said film-winding motor in the deenergized condition for a sufficient time to effect a double exposure, and means following a double exposure for overriding said changeover means and effecting normal energization of both motors in response to a shutter release completion signal.

2. In a multiple exposure camera according to claim 1 in which said changeover means includes a flip flop circuit, and in which said last means includes a solenoid operated double exposure switch, means responsive to energization of said shutter cocking motor to control energization of said solenoid, and means responsive to actuation of said double exposure switch for controlling the output of said flip flop circuit.

* * * * *